(12) United States Patent
Linke et al.

(10) Patent No.: US 7,469,775 B2
(45) Date of Patent: Dec. 30, 2008

(54) DISC BRAKE, PARTICULARLY FOR A COMMERCIAL VEHICLE

(75) Inventors: Tobias Linke, Bad Vilbel (DE); Wlodzimierz Macke, Olching (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 306 days.

(21) Appl. No.: 10/543,107

(22) PCT Filed: Dec. 22, 2003

(86) PCT No.: PCT/EP03/14727
§ 371 (c)(1),
(2), (4) Date: Jan. 4, 2006

(87) PCT Pub. No.: WO2004/065813
PCT Pub. Date: Aug. 5, 2004

(65) Prior Publication Data
US 2006/0219489 A1    Oct. 5, 2006

(30) Foreign Application Priority Data
Jan. 22, 2003   (DE)   ............................. 103 02 332

(51) Int. Cl.
*F16D 65/40* (2006.01)
*F16D 55/02* (2006.01)
(52) U.S. Cl. ................................. 188/73.38; 188/72.9

(58) Field of Classification Search .... 188/73.35–73.39
See application file for complete search history.

(56) References Cited

U.S. PATENT DOCUMENTS

| 4,658,938 | A | * | 4/1987 | Thiel et al. | ............... | 188/73.38 |
| 4,773,511 | A | * | 9/1988 | Giering et al. | ........... | 188/73.38 |
| 5,875,873 | A | * | 3/1999 | Kay et al. | ................ | 188/73.38 |
| RE38,874 | E | * | 11/2005 | Bieker et al. | ............... | 188/72.9 |

FOREIGN PATENT DOCUMENTS

| EP | 0 534 987 B1 | 8/1994 |
| EP | 0 703 378 A1 | 3/1996 |
| EP | 0 877 176 A2 | 11/1998 |

* cited by examiner

*Primary Examiner*—Christopher P Schwartz
(74) *Attorney, Agent, or Firm*—Crowell & Moring LLP

(57) ABSTRACT

The invention relates to a disc brake, particularly for a goods vehicle, comprising a brake caliper, which has a brake disc that can be brought into active contact with brake shoes and which can be fixed to a brake support in a manner that enables it to be axially displaced relative to the brake disc. The inventive disc brake also comprises a closure plate, which closes the brake caliper on the side facing the brake disc, and comprises a removable retainer, which is fixed relative to the brake caliper and on which springs acting upon the outer edges of the brake shoes are supported. The disc brake is designed in such a manner that a fixing device is provided in the closure plate, and the facing end of the retainer lies inside the fixing device while being held in a direction of loading.

20 Claims, 2 Drawing Sheets

DISC BRAKE, PARTICULARLY FOR A COMMERCIAL VEHICLE

BACKGROUND AND SUMMARY OF THE INVENTION

The present invention relates to a disc brake, particularly for a utility or commercial vehicle.

A disc brake of this type is known, for example, from European Patent document EP 0 534 987 B1. The retaining clamp of this disc brake essentially has the purpose of forming an abutment for springs, in this case, leaf springs, which elastically brace the brake pads. The retaining clamp is detachable in order to ensure a fast mounting, as well as demounting, mainly of the brake pads. The latter takes place, for example, in order to permit access to the brake pads without any problems, which is necessary for a brake pad change.

The fact that the retaining clamp can be attached and removed by the use of simple devices also contributes to the above. For this purpose, the retaining clamp is, on one side, inserted into a recess of the caliper and is, on the other side, fixedly connected with the caliper, for example, by the use of screws, while bridging an insertion opening for the brake pads.

The holding device of the caliper for the retaining clamp is normally situated in an area adjacent to the closing plate and is also made during the casting of the caliper produced as a cast part.

However, for this purpose, measures are required which counteract a simple and economical production of the caliper. Thus, for forming the pocket-shaped holding device, an additional core is required, which is to be fitted onto the caliper core, which can naturally be implemented only by means of more manufacturing expenditures.

This circumstance also has special significance from a business management point of view because such disc brakes are produced in large piece numbers in serial production.

It is therefore an object of the present invention to further develop a disc brake of the above-mentioned type such that it has a simpler construction and can be produced and mounted in a more cost-effective manner.

This object is achieved by providing a disc brake, particularly for a commercial vehicle, having a caliper straddling a brake disc and which can be brought into an operative connection with brake pads and is axially displaceable relative to the brake disc, the caliper being fastened to a brake anchor plate. The disc brake has at least one closing plate, which closes the caliper particularly on one of the sides facing the brake disc, as well as having a detachable retaining clamp, which is stationary with respect to the caliper and on which springs are supported which act upon the outer edges of the brake pads. A holding device is provided in or on the closing plate, in which holding device the facing end of the retaining clamp rests while being held in the loading direction.

This type of disc brake is particularly characterized in that it can be produced and mounted more economically. Since a caliper-side holding device for the retaining clamp can be eliminated, the production of the caliper as a casting can be carried out more easily, mainly, because no additional core has to be inserted.

On the other hand, a corresponding holding device can be produced without any problems and additional working expenditures in or on the closing plate, the latter being produced from sheet metal as a punched bent part. Naturally, this not only results in a more cost-effective production but also in the avoidance of rejects, which can definitely occur during the casting-in of the holding device. Together with the simplification of the casting core, the casting process as a whole is therefore optimized.

Furthermore, by use of the invention, a tolerance range is achieved which is reduced with respect to the positioning precision of the retaining clamp, which tolerance range results in a more accurate fixing of the brake pads, particularly by the reduction of the spread of the prestressing of the leaf springs, which so far had been possible only by an additional machining.

Another production advantage is the reduction of the machining of the sealing surface of the brake anchor plate with respect to the closing plate, which contributes as much to a manufacturing-related optimization as the resulting saving of material.

According to an advantageous further development of the invention, it is provided that the form closure of the retaining clamp with the closing plate be achieved such that a holding device is provided in the closing plate into which the retaining clamp is inserted on an end side. The holding device may be constructed as a slot, which in its contour and dimensions, corresponds to those of the retaining clamp. In this case, the slot may be punched out in an open manner or be constructed as a pocket, which then completely encloses the retaining clamp in the inserted end area.

While, as a result of the pocket-shaped construction of the slot, a sufficient stability of the closing plate exists in this area, in the case of an open slot, it is achieved in that two mutually opposite or surrounding ribs are provided which extend in a bent manner from the surface of the closing plate otherwise in the longitudinal direction of the retaining clamp. Instead of stability-increasing ribs, beads or similar deformations may also be provided.

For stiffening the closing plate shaped from the sheet metal, a partially or completely surrounding rib forming the outer wall may be provided in the form of a bend.

This bend is also meaningful if, according to another aspect of the invention, for the form closure, it is shaped in the form of a lug with a wall bounding it on three sides, in which the retaining clamp rests. The fixing of the retaining clamp takes place by the wall bounding the lug, on the one side, and by the assigned leaf spring, on the other side.

In each case, the leaf spring can now be fixed by use of very simple manufacturing measures, that is, by use of a machining requiring few expenditures, specifically only by a corresponding shaping of the closing plate during the punching, for which only the punching tool has to have a corresponding design.

Additional advantageous developments of the invention are described and claimed herein.

Embodiments of the invention will be described in the following by means of the attached drawings.

DETAILED DESCRIPTION OF THE DRAWINGS

Figure 1:
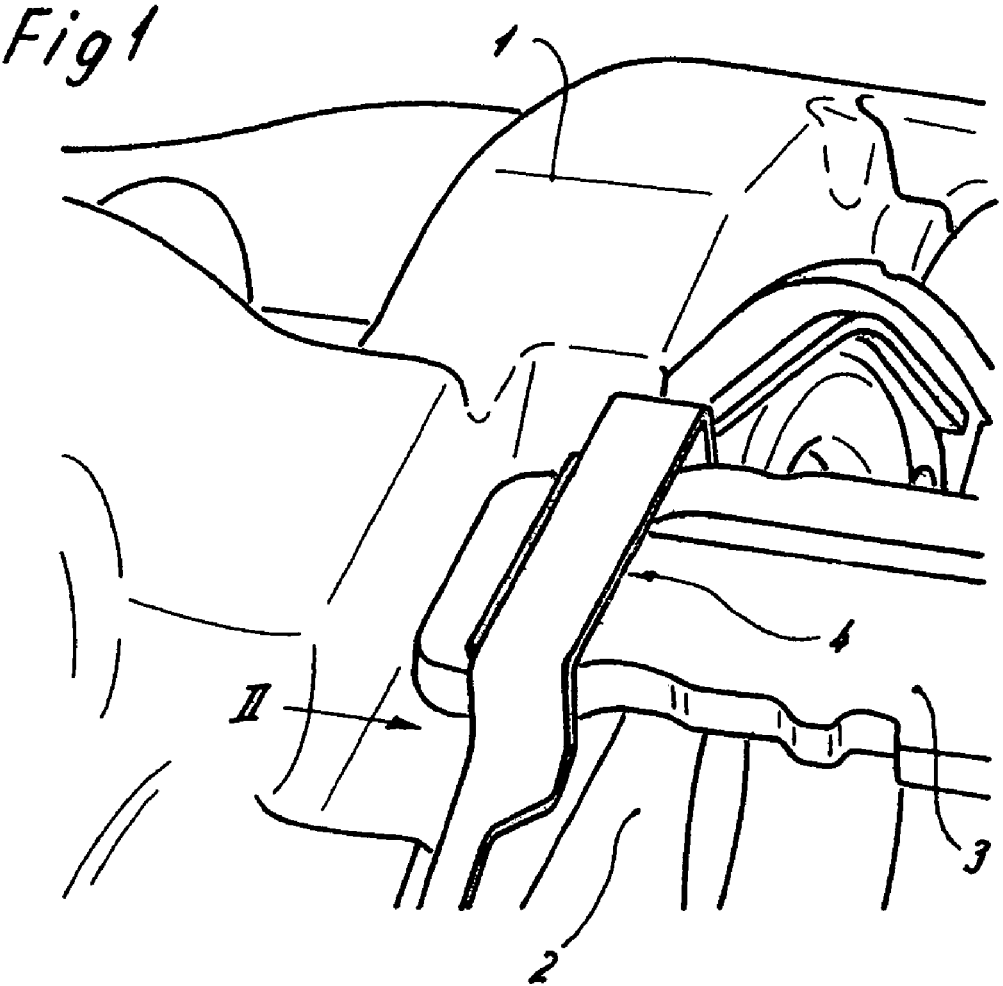
FIG. 1 is a perspective view of a partial cutout of a disc brake according to the invention.
Figure 3:
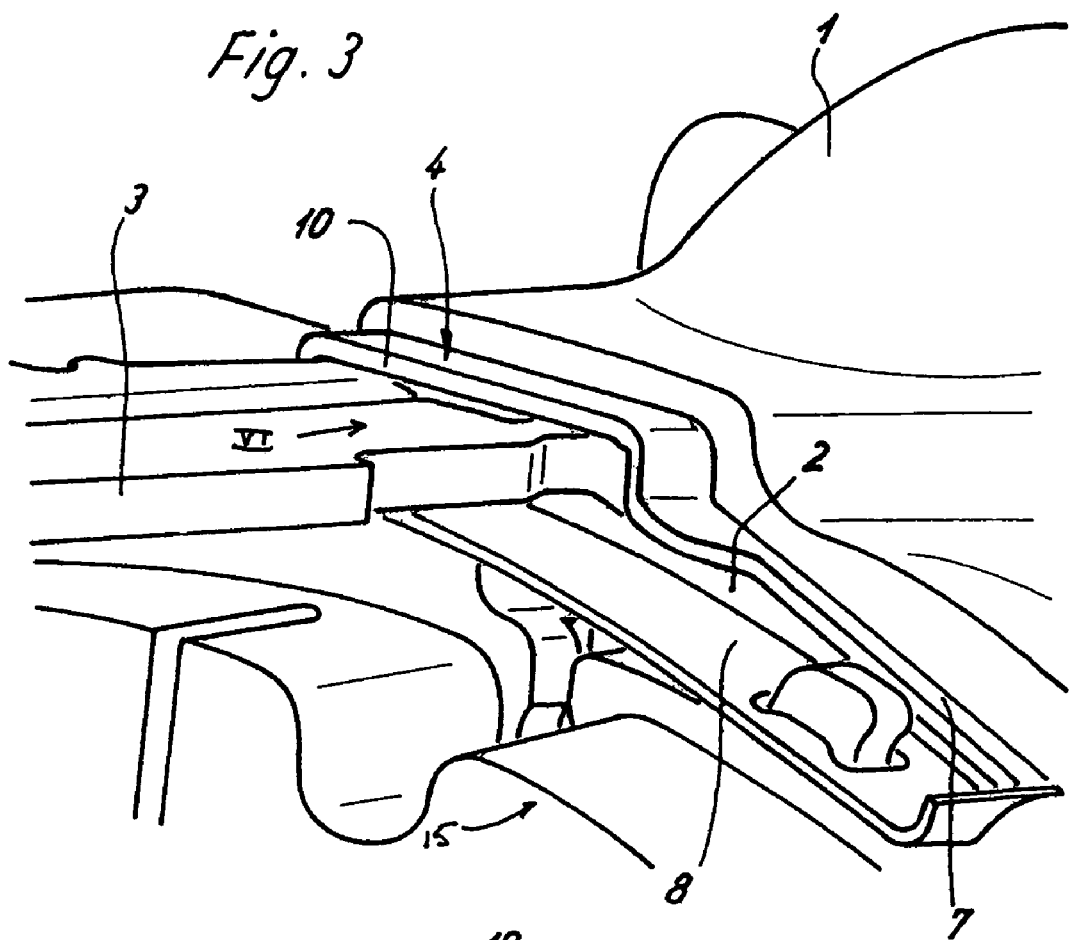
FIG. 3 is a perspective partial cutout view of another embodiment of a disc brake.

In FIGS. 1 and 3, one disc brake, respectively, is shown in a cutout, particularly for a commercial vehicle, which disc brake has a caliper 1, which is closed here via a closing plate 2 on a side which faces a brake disc (not shown). A brake application device is arranged behind the closing plate 2 in the caliper 1.

Brake pads (one of which 15 is shown in FIG. 3) are held down by the use of leaf springs 8 (FIG. 3) under spring tension. On the other side, the leaf springs 8 are supported on a retaining clamp 3 resting formlockingly in the closing plate 2.

Figure 2:
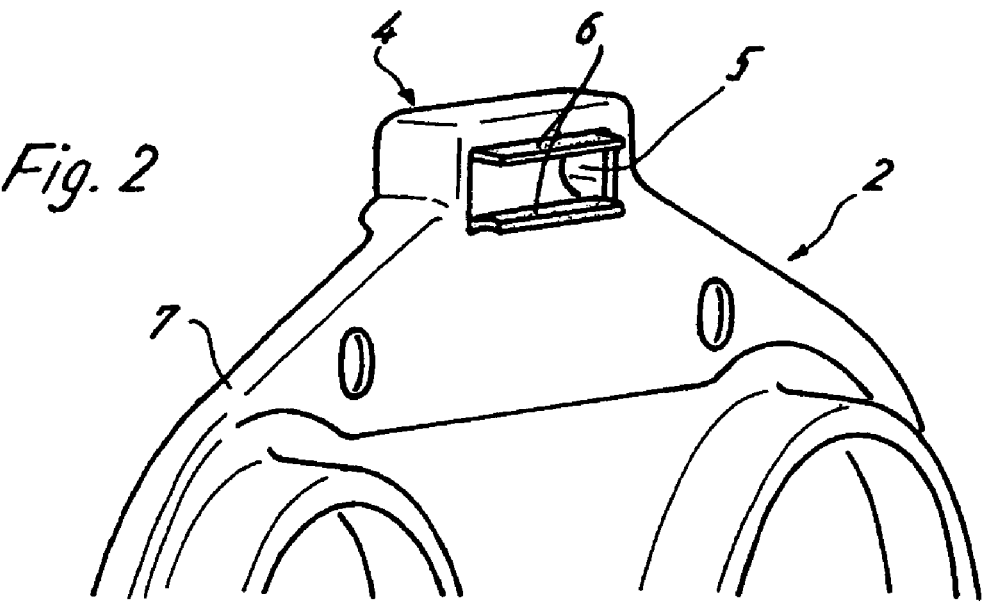
FIG. 2 is a detailed view of a closing plate of the disc brake according to FIG. 1, viewed in the direction of the arrow II in FIG. 1.

For this purpose, the closing plate 2 has a holding device 4 which, in the embodiment according to FIGS. 1 and 2, consists of a punched-out slot 5 equipped on the top and bottom side with two bent ribs 6 which, however may also be constructed to be surrounding, thus framing the slot 5. The ribs 6 are used for reinforcement with respect to increasing the stability.

As indicated very clearly particularly in FIG. 1, the retaining clamp 3 is fitted through the slot 5 which, in its rectangular contour, corresponds in its dimension as well as in its shape to the cross-section of the retaining clamp 3. Instead of being provided with the open slot 5, the holding device 4 may be provided with a closed bottom, so that the retaining clamp 3 is inserted with its assigned end area but does not protrude.

Figure 4:
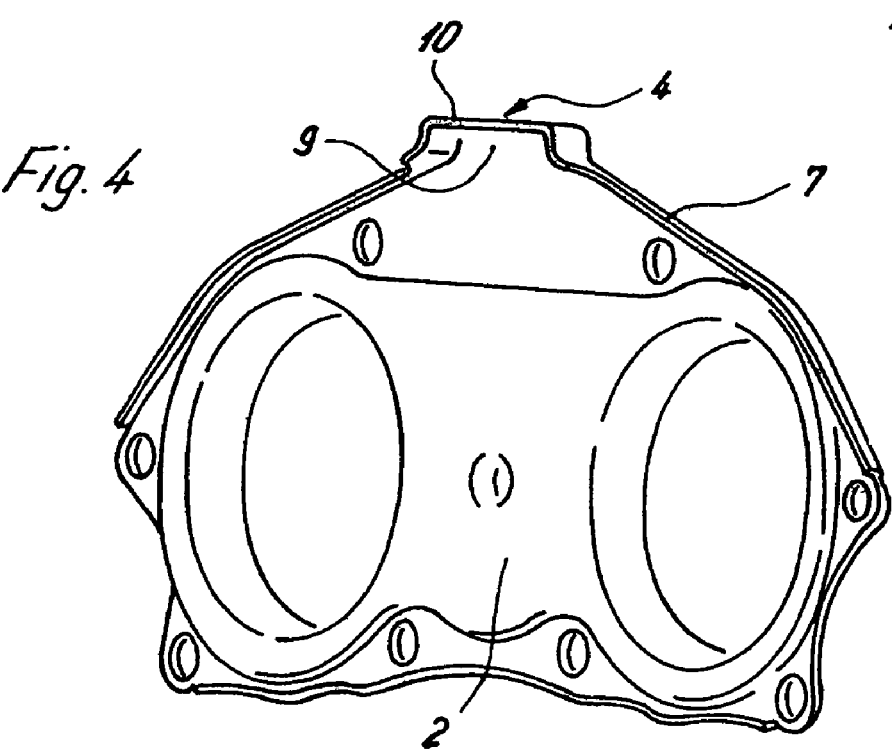
FIG. 4 is a detailed view of a closing plate of the disc brake according to FIG. 3, viewed in the direction of the arrow IV in FIG. 3.

In the example illustrated in FIGS. 3 and 4, the closing plate 2 for the form-locking holding of the retaining clamp 3 has a lug 9, which extends planely with respect to the surface area of the closing plate 2, and which is bounded on three sides by a wall 10 otherwise bent at an angle with respect to the closing plate 2, such that the retaining clamp 3 rests against it. In this case, the walls 10 form a reinforcement of the closing plate 2, comparable to the ribs 6 in the embodiment according to FIGS. 1 and 2. In contrast to the retaining clamp 3 used in FIGS. 1 and 2, here the retaining clamp 3 has slightly shorter dimensions corresponding to FIGS. 3 and 4 because it rests maximally against the surface of the closing plate 2.

The walls 10 or the exterior-side boundary of the holding device 4 is continued in ribs 7 which extend on both sides over a partial area on the exterior wall of the closing plate 2 and contribute to an increase of the bending resistance. In this case, the ribs 7 otherwise extend at an angle with respect to the surface of the closing plate 2.

Table of Reference Numbers

| | |
|---|---|
| 1 | caliper |
| 2 | closing plate |
| 3 | retaining clamp |
| 4 | holding device |
| 5 | slot |
| 6 | rib |
| 7 | rib |
| 8 | leaf spring |
| 9 | lug |
| 10 | wall |

The invention claimed is:

1. A disc brake for a commercial vehicle having a caliper which, in use, straddles a brake disc that is brought into an operative connection with brake pads, the caliper being axially displaceable relative to the brake disc, the disc brake comprising:
  at least one closing plate which, in use, closes off an opening in the caliper that, in use, faces the brake disc;
  a detachable retaining clamp, which is stationarily arranged with respect to the caliper and which, in use, supports springs acting upon the brake pads; and
  wherein the closing plate includes a holding device in which a facing end of the retaining clamp rests while being held in a loading direction.

2. The disc brake according to claim 1, wherein the holding device comprises an open slot into which the facing end of the retaining clamp is fitted.

3. The disc brake according to claim 2, wherein the open slot is a bounded on at least one side by a rib bent so as to extend at an angle from a plane of the closing plate.

4. The disc brake according to claim 3, wherein the rib completely surrounds the open slot in an enclosed manner.

5. The disc brake according to claim 2, wherein the slot has a pocket-shaped design and a closed bottom.

6. The disc brake according to claim 1, wherein the holding device comprises a lug of the closing plate, which lug is bounded by a three-sided wall.

7. The disc brake according to claim 6, wherein the lug extends in a planar manner with a remaining adjoining area of the closing plate.

8. The disc brake according to claim 1, wherein the holding device of the closing plate is formed via a punching operation.

9. The disc brake according to claim 1, wherein a dimension and contour of the holding device corresponds to a dimension and contour of the end of the retaining clamp.

10. The disc brake according to claim 1, wherein edge areas of the closing plate adjacent to the holding device are provided at least in areas with a rib.

11. An apparatus for securing a disc brake detachable retaining clamp, which detachable retaining clamp is fixed relative to a caliper and on which springs acting upon brake pads are supported, the apparatus comprising:
  a closing plate configured to close off an opening in the caliper which, in use, faces a brake disc; and
  wherein the closing plate includes a fixing device in which is arranged an end of the detachable retaining clamp so as to be held in a loading direction of the detachable retaining clamp.

12. The apparatus according to claim 11, wherein the fixing device is formed as a slot in which the end of the detachable retaining clamp is fitted.

13. The apparatus according to claim 12, wherein the slot is bounded on at least one side by a rib bent at an angle with respect to a plane of the closing plate.

14. The apparatus according to claim 13, wherein the rib completely surrounds the slot.

15. The apparatus according to claim 12, wherein the slot has a pocket-shaped design including a closed bottom.

16. The apparatus according to claim 11, wherein the fixing device is formed as a lug on the closing plate, which lug is bounded by a three-sided wall, one side of which is arranged in the loading direction.

17. The apparatus according to claim 16, wherein the lug extends in a planar manner which respect to an adjoining area of the closing plate.

18. The apparatus according to claim 11, wherein the closing plate includes at least one opening so as to allow a brake application device arranged in the caliper to act upon the brake pads.

19. The apparatus according to claim 11, wherein the fixing device of the closing plate is formed by punching.

20. The apparatus according to claim 11, wherein the closing plate is a metal closing plate including a punched hole fixing device.

\* \* \* \* \*